June 20, 1933.  E. O. NICE  1,914,784
SEED THRESHING MACHINE
Filed April 1, 1929   3 Sheets-Sheet 1
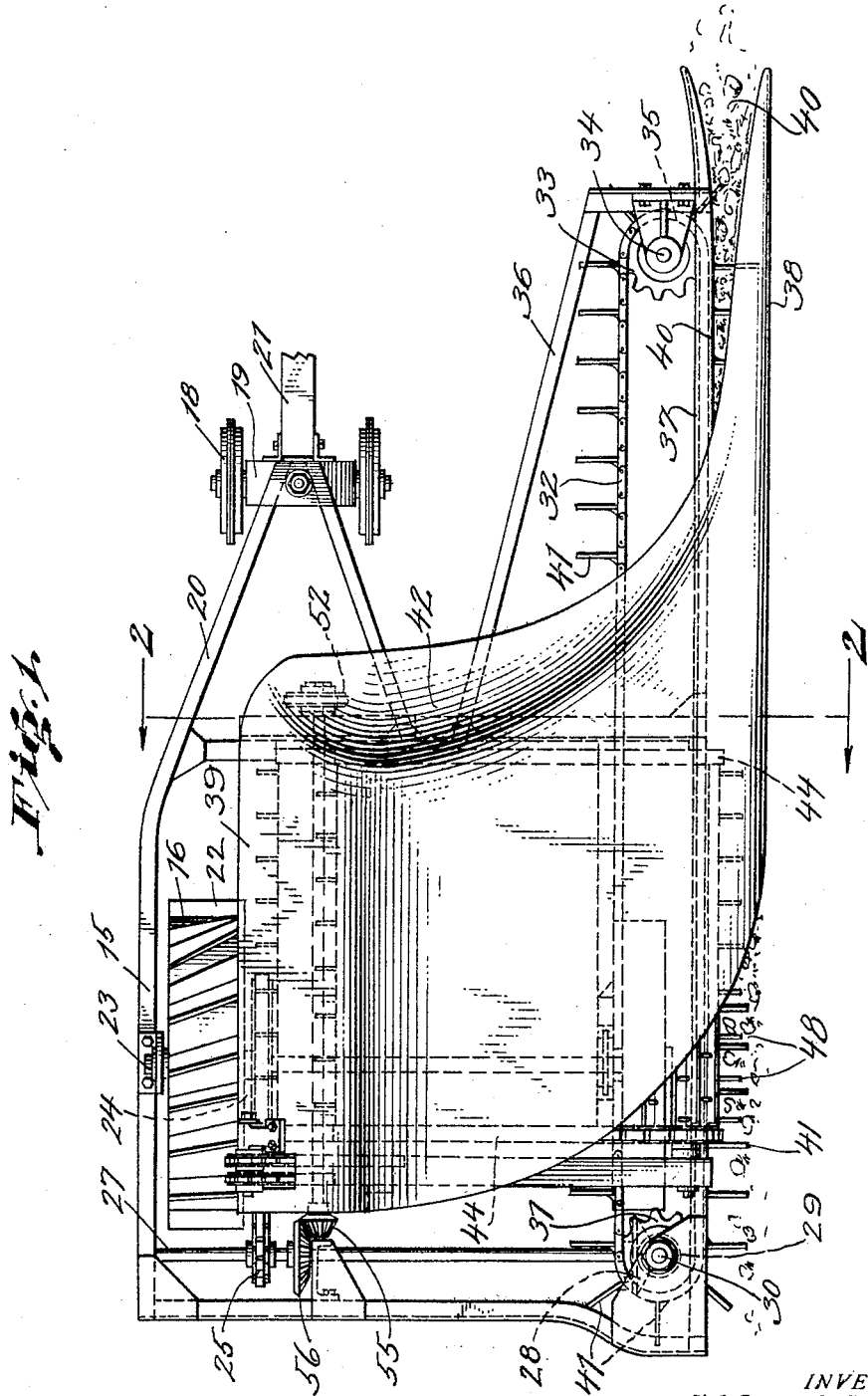
INVENTOR
Edgar O. Nice
BY Munn & Co.
ATTORNEY

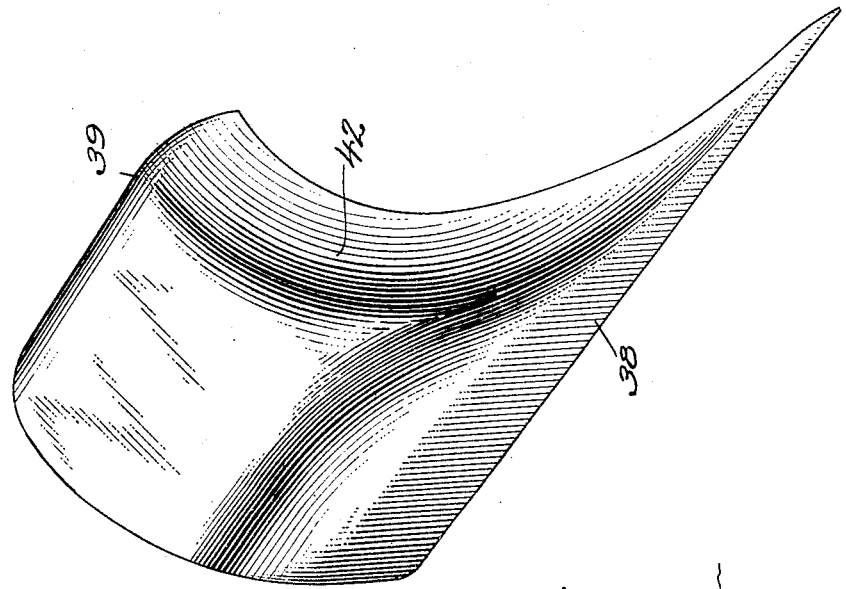
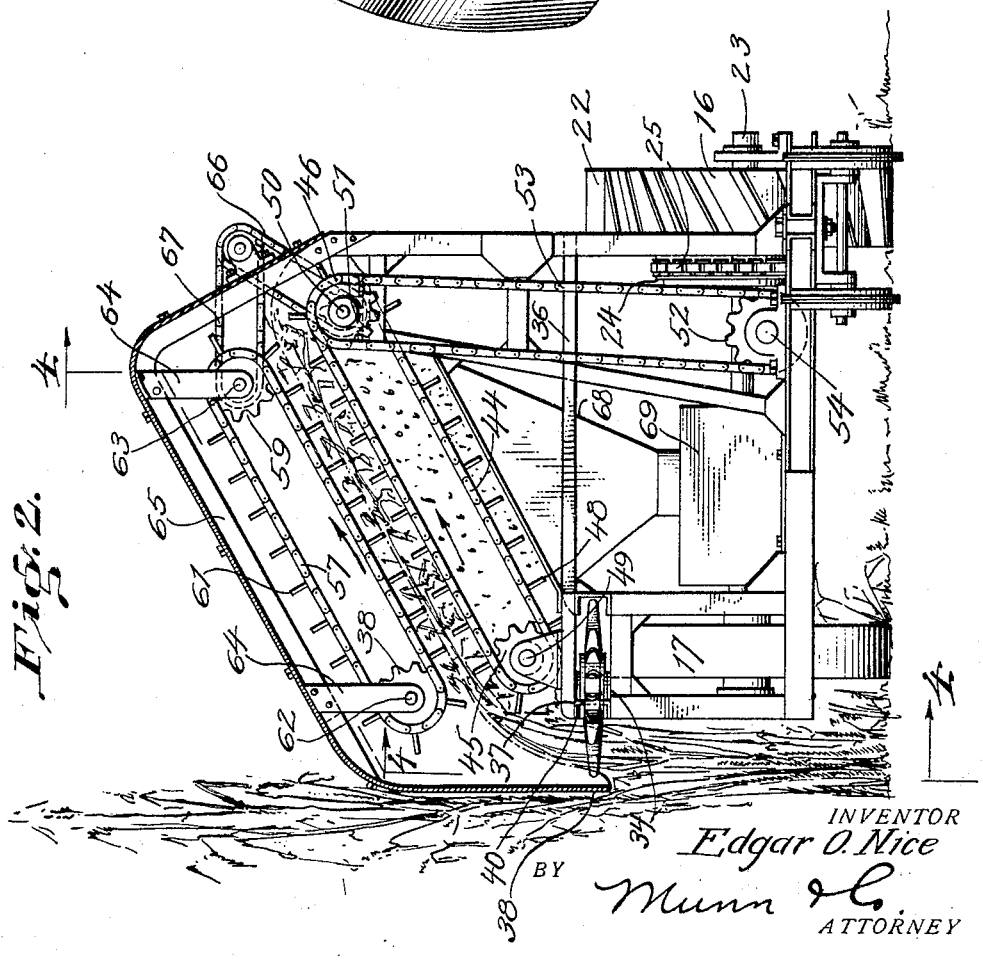

June 20, 1933.  E. O. NICE  1,914,784
SEED THRESHING MACHINE
Filed April 1, 1929  3 Sheets-Sheet 3
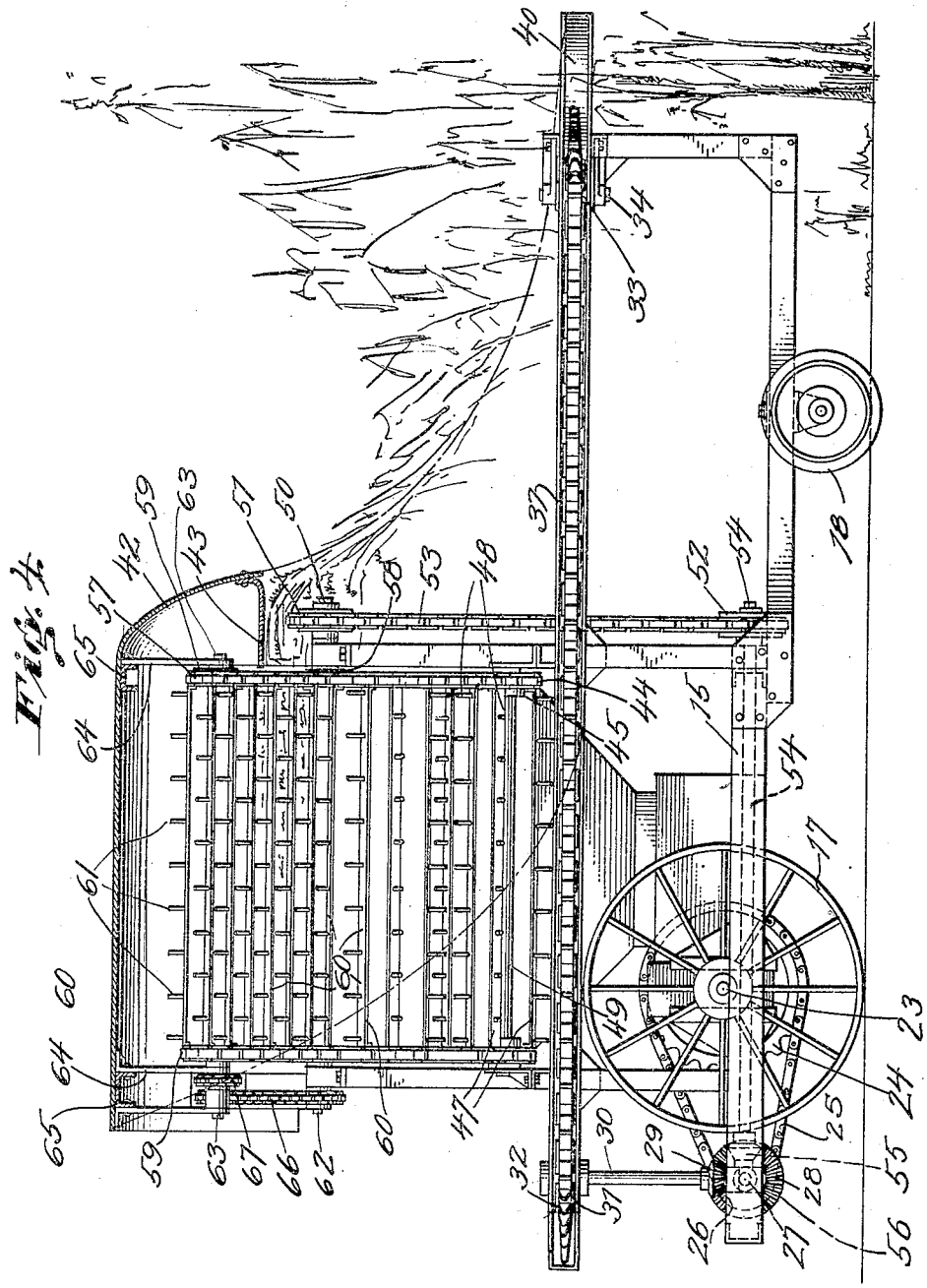
INVENTOR
Edgar O. Nice
BY Munn & Co.
ATTORNEY Patented June 20, 1933

1,914,784

UNITED STATES PATENT OFFICE

EDGAR O. NICE, OF EL CENTRO, CALIFORNIA

SEED THRESHING MACHINE

Application filed April 1, 1929. Serial No. 351,682.

My invention relates to machines for treating leguminous plants to remove the seeds from the pods thereof, and it has for a purpose the provision of a machine which is characterized by a mechanism that is bodily movable through a field of leguminous plants, and operable to thresh the seeds from the pods of the standing stalks, and to collect the seeds, all without breaking, uprooting, or injuring the plants in any other manner than to open the pods and remove the seeds. My invention is particularly adapted, although not necessarily, for the threshing of the seed pods of the Sesbania plant, the difficulty, labor and expense involved to collect the seeds being, it is believed, fully appreciated by those skilled in the art.

I will describe only one form of seed threshing machine embodying my invention and will then point out the novel features thereof in claims.

In the accompanying drawings:

Fig. 1 is a view showing in top plan, one form of seed threshing machine embodying my invention.

Fig. 2 is a vertical sectional view taken on the line 2—2 of Fig. 1.

Fig. 3 is a detailed perspective view of the hood and one of the stalk guiding members embodied in the machine shown in the preceding views.

Fig. 4 is a vertical longitudinal sectional view taken on the line 4—4 of Fig. 2.

My invention in its present embodiment comprises a vehicle consisting essentially of a frame 15 supported for rolling movement by means of rear wheels 16 and 17 and front wheels 18. The front wheels 18 are relatively small and are mounted on a yoke 19 pivoted on an extension 20 of the frame 15, a draft bar 21 being connected to the yoke, and by which the vehicle as a whole may be pulled over the ground. The wheel 16 is provided on its periphery with fins 22 in order that sufficient traction may be secured to prevent slipping of the wheel. The wheels 16 and 17 are mounted on an axle 23 suitably journaled in the frame 15. Fixed to the axle is a sprocket wheel 24 about which is trained a chain 25. A relatively small sprocket wheel 26 is fixed to a shaft 27 journaled in and extending transversely of the frame 15 as clearly illustrated in Fig. 1. As shown in Fig. 4, the shaft 27 is provided with a miter gear 28 which constantly meshes with miter pinions 29, the latter being fixed to a vertical shaft 30 journaled in the frame. The upper end of the shaft 30 is provided with a sprocket wheel 31 about which is trained an endless chain 32 of such length as to also extend around a sprocket wheel 33 fixed to a second but relatively short vertical shaft 34. This shaft 34 is journaled in bearings 35 secured to an extension 36 of the frame 15. As a part of the extension and as a part of the frame, is a channel bar 37 disposed horizontally and extending longitudinally of the frame and extension. This bar 37 is of channel form and constitutes one of a pair of stalk guiding members. The other guide member is indicated at 38 and constitutes a forward extension of a hood 39. The two guide members 37 and 38 are disposed in spaced parallelism to define an intervening passage 40 open at its opposite ends and widened at its forward end by flaring the members 37 and 38 outwardly as clearly illustrated in Fig. 1. The forward end of the passage 40 constitutes the entrance for standing stalks to enter the passage under advanced movement of the vehicle.

To prevent forward bending of the stalks, a function necessary to the proper operation of the machine in the threshing of the seed pods, I provide on the chains 32 a plurality of arms or projections 41 secured at regular spaced intervals along the length of the chain. As shown in Figs. 1 and 4 the outside stretch of the chain 32 is positioned to move at the inner side of the channel bar 37 and to thus dispose the projections 41 within the passage 40. The projections are thus disposed transversely of the passage to form partitions for dividing the passage into compartments. The purpose of the compartments and the functions of the projections will be described hereinafter.

As clearly shown in Figs. 1 and 3 the guide member 38 is tapered in form and merges into the hood 39 in such manner as to form an intervening cam portion 42 which is shaped to produce a lateral bending of the stalks traversing the passage 40 under advanced movement of the vehicle so that by the time the stalks have reached a position beneath the hood 39, they assume the inclined position illustrated in Fig. 2. As shown in Fig. 4 a partition 43 is secured to the inner side of the cam portion 42 so as to be disposed horizontally and to thus form an abutment which serves to maintain the stalks laterally bent as they enter between the pod-beating units, which latter will now be described.

In the present embodiment of my invention I have shown two such pod-beating units, although it will be understood that it may be possible to use only a single unit, and which, in conjunction with the hood 39, would operate to beat the pods and thus remove the seeds, with a certain degree of effectiveness. However, a higher percentage of seed recovery may be accomplished by the use of two pod-beating units, preferably constructed and arranged as illustrated. As shown to advantage in Fig. 2, I provide a lower pod-beating unit comprising a pair of endless chains 44 trained about sprockets 45 and 46, and connected at intervals by cross-bars 47 (Fig. 4) and, to which latter are secured beating fingers 48. As shown in Fig. 4 the fingers 48 are secured at spaced intervals along the length of each bar and are designed to extend to the outer sides of the chains as shown in Fig. 2. The sprocket wheels 45 and 46 are secured, respectively, to shafts 49 and 50, the shaft 50 being driven by a sprocket wheel 51 connected to a similar wheel 52 by an endless chain 53. The wheel 52 is fixed to a horizontal shaft 54 that extends rearwardly in the frame with its rear-end provided with a miter pinion 55 which constantly meshes with a miter gear 56 secured to the shaft 27.

Above the aforedescribed lower pod-beating unit is an upper unit likewise comprising a pair of endless chains 57 trained about sprocket wheels 58 and 59 and connected by cross-bars 60 provided with beating fingers 61. The sprocket wheels 58 and 59 are fixed respectively, to shafts 62 and 63 journaled in suitable hangers 64 depending from a frame 65 to which latter is secured the hood 39. The shaft 63 is driven from the shaft 50 by the two chain and sprocket connections 66 and 67 illustrated.

The arrangement of the two pod-beating units is such that the upper stretches of the chains 44, and the lower stretches of the chains 57 are in confronting relation to each other but spaced apart a distance to accommodate the intervening beating fingers 48 and 61. The positioning of the fingers 48 in respect to the finger 61 is such, that they occupy positions staggered with respect to each other in order that they may properly act upon the seed pods to open and remove the seeds therefrom. The two units are so supported as to occupy positions inclined with respect to the vertical for the purpose of receiving therebetween the laterally bent portions of the stalks. With the units operating, the confronting stretches of the chains thereof move in the direction of the arrows, so that the beating fingers are caused to travel upwardly.

Beneath the pod-beating units is a funnel 68 communicating at its lower end with a receptacle 69. This funnel serves to receive the seeds removed from the pods of the plants as they fall between the bars of the lower beating unit, and to conduct the seeds into the receptacle 69.

The operation of the machine is as follows:

Under forward movement of the vehicle, and through the aforedescribed mechanisms, the wheel 16 operates to drive the chains of the pod-beating units as well as the chain 32, the latter chain being driven in such direction as to cause that stretch of chain disposed within the bar 37 to move rearwardly, and at a speed corresponding to the speed of movement of the vehicle forwardly. In consequence, the projections 41 within the passage 40 are stationary with respect to the plant stalks which they engage, so as to form abutments that operate to restrain the stalks against forward bending.

In practice, the vehicle is positioned in a field so that the passage 40 is aligned longitudinally at the end of a row of leguminous plants such, for example, as the Sesbania illustrated. The vehicle is now moved forwardly causing the plant stalks to move into the entrance end of the passage, where they are engaged by the projections and divided into bunches or groups, the stalks of each group being confined to upright position intermediate their ends against any tendency to bend in any direction, and particularly forward. As the vehicle continues to advance, the stalks are caused to travel rearwardly within the passage, engaging the cam portion 42, and by reason of the curvature of the latter, they are bent or flexed laterally to an inclined position which corresponds to the inclination of the space between the two pod-beating units. Under the guiding action of the partition 43 the bent stalks are maintained in inclined position until they enter between the units where the pods of the stalks are subjected to the beating action of the fingers 48 and 61. By reason of the staggered arrangement and upward motion of the beating fingers, they function to beat the pods in such manner that they are opened and the seeds ejected therefrom, the stalks and pods continuing to travel rearwardly between the units, during this operation, and finally passing from between the units and clear of the machine.

The bending of the plant stalks by the machine is such, that the stalks after passing from the machine return to upright position so that aside from breaking open the pods, the plants are injured in no other manner. The seeds discharged from the pods fall between the bars 47 of the lower unit and into the funnel 68 from whence they are finally received in the receptacle 69.

Although I have herein shown and described only one form of seed threshing machine embodying my invention, it is to be understood that various changes and modifications may be made herein without departing from the spirit of the invention and the spirit and scope of the appended claims.

I claim:

1. A seed threshing machine, comprising a vehicle, inclined seed threshing means so positioned on the vehicle as to be operable under advance movement of the vehicle to remove seeds from the pods of standing leguminous plants successively, where and when the stalks thereof are in a position inclined with relation to the vertical, and means on the vehicle for moving said stalks to an inclined position, and successively under advance movement of the vehicle, so as to cause the stalks to enter the first means while inclined.

2. A seed threshing machine comprising a vehicle having thereon seed threshing means and means so positioned on the vehicle as to be operated under advance movement of the vehicle for flexing downwardly the upper part of the standing stalks of leguminous plants so as to be acted upon by the first means and the seed removed from the pods thereof, the first means comprising at least one pod-beating element disposed and operating on an incline, and an inclined hood positioned above the pod-beating element.

3. A seed threshing machine comprising a vehicle having thereon seed threshing means, and means so positioned on the vehicle as to be operated under advance movement of the vehicle for flexing downwardly the upper part of the standing stalks of leguminous plants so as to be acted upon by the first means and the seed removed from the pods thereof, the first means comprising a pair of pod-beating elements inclined and spaced to receive therebetween the inclined parts of said stalks, and means for operating said elements to cause them to coact in beating the pods in a manner to open and remove the seeds therefrom.

4. A seed threshing machine, comprising a vehicle, a receptacle on the vehicle and means on the vehicle for bending stalks of leguminous plants, successively, as the vehicle advances, and so that the pods of the stalks overlie the receptacle, said means comprising a pair of members stationary on the vehicle and spaced to define a passage in which the stalks are received, one of said members having a cam portion positioned to engage the stalks and bend the upper portions of the latter to inclined position.

5. A seed threshing machine, comprising a vehicle, a receptacle on the vehicle and means on the vehicle for bending stalks of leguminous plants, successively, as the vehicle advances, and so that the pods of the stalks overlie the receptacle, said means comprising a pair of members stationary on the vehicle, with one of the members having a cam portion for bending the stalks to an inclined position, and means movable between the members to engage the stalks and hold the latter against forward bending.

6. A seed threshing machine as embodied in claim 5 wherein the last means comprises an endless chain having projections at spaced intervals thereon, and means for operating the chain to move said projections at a rate corresponding to the rate of movement of the vehicle forwardly so that in respect to the stalks, the projections are stationary.

7. A seed threshing machine, comprising a vehicle, a receptacle on the vehicle and means on the vehicle for bending stalks of leguminous plants, successively, as the vehicle advances, and so that the pods of the stalks overlie the receptacle, said means comprising a pair of members stationary on the vehicle and in spaced relation to each other to define a stalk receiving passage extending lengthwise of the vehicle, one of said members having a cam portion engaged by the stalks to bend the latter to an inclined position, an endless chain having projections at intervals thereon, with one stretch of the chain disposed between said members, so that when the chain is actuated the projections will successively enter and leave the passage, and while therein, form partitions that divide the passage transversely into compartments, and means for operating the chain so that the projections move rearwardly in the passage at the same rate of speed as the vehicle moves forward.

8. In a seed threshing machine, a vehicle, a pair of guide members extending longitudinally of the vehicle and arranged in spaced relation to define a longitudinal passage, one of the members having an upwardly extending portion shaped to engage stalks and bend the latter to an inclined position under the advance movement of the vehicle.

9. In a seed threshing machine, a vehicle, a pair of guide members extending longitudinally of the vehicle and arranged in spaced relation to define a longitudinal passage, one of the members having an upwardly extending portion shaped to engage stalks and bend the latter to an inclined position under the advance movement of the vehicle, elements disposed between the members and transversely of the passage to divide the latter into compartments, means for supporting the elements for movement rearwardly within the passage, and means for moving the elements at a predetermined rate of speed.

10. A seed threshing machine, comprising a vehicle, and means so positioned thereon as to be operable under advanced movement of the vehicle to flex leguminous plant stalks, so that the stalks are successively moved to a predetermined inclined position, means associated with the first means so as to support the stalks against forward bending so that the stalks are caused to be engaged and flexed by the first means, and means so positioned on the vehicle as to thresh the pods on the stalks while the latter are in an inclined position.

11. A seed threshing machine as embodied in claim 10 wherein the second means comprises a plurality of partitions disposed transversely of the first means and mounted for movement, and means for moving the partitions rearwardly of the first means at a rate corresponding to the forward movement of the vehicle.

12. A seed threshing machine, comprising a vehicle, a pair of stationary members on the vehicle and extending forwardly thereof, said members being disposed in spaced relation to each other to define a passage in which the standing stalks of leguminous plants are adapted to be received as the vehicle advances, an endless chain on the vehicle provided at intervals with projections, said chain being positioned in respect to said members so that the projections of one stretch of the chain are disposed within said passage to define transverse positions within said passage, means for operating the chain to move said projections rearwardly within the passage at a rate of speed corresponding to the forward movement of the vehicle, one of said members having a cam portion which, under advanced movement of the vehicle, engages and bends the stalks to an inclined position, a pair of pod-beating units on the vehicle superposed and inclined so as to receive therebetween the inclined portions of said stalks under advanced movement of the vehicle and to allow the stalks to pass from between the units, means for actuating said units in a manner to break the pods and discharge the seeds therefrom and means beneath said units for receiving and collecting the seeds.

EDGAR O. NICE.